United States Patent [19]

Lee et al.

[11] Patent Number: 5,727,124
[45] Date of Patent: Mar. 10, 1998

[54] METHOD OF AND APPARATUS FOR SIGNAL RECOGNITION THAT COMPENSATES FOR MISMATCHING

[75] Inventors: Chin-Hui Lee, New Providence, N.J.; Ananth Sankar, Fremont, Calif.

[73] Assignee: Lucent Technologies, Inc., Murray Hill, N.J.

[21] Appl. No.: 263,284

[22] Filed: Jun. 21, 1994

[51] Int. Cl.$^6$ .................................................. G10L 5/00
[52] U.S. Cl. ............................................ 395/2.42; 395/2.54
[58] Field of Search ........................ 381/41, 30, 43; 395/2.43, 2.42, 2.53, 2.54, 2.41, 2.48, 2.65

[56] References Cited

U.S. PATENT DOCUMENTS

| | | |
|---|---|---|
| 4,596,031 | 6/1986 | Hakaridani et al. ............... 381/43 |
| 5,222,146 | 6/1993 | Bahl et al. ........................ 381/41 |

OTHER PUBLICATIONS

Lee C-H et al., A study on speaker adaptation of continuous density HMM parameters, IEEE Feb. 2 1990.

Tattersall G D, et al., University of East Anglia, UK, Oct. 1989.

Von Compernolle, D, Computer Speech and Language, n. 3, Jul. 1989.

Allen Gersho and Robert M. Gray, "Vector Quantization I: Structure and Performance" Victor Quantization and Signal Compression –Kluwer Academic Publishers pp. 309–423.

GSM Recommendation 06.20 (Ver. 0.0.4), Jan. 11, 1995.

*Primary Examiner*—Allen R. Macdonald
*Assistant Examiner*—Robert Sax

[57] ABSTRACT

Disclosed is a method for drastically reducing the average error rate for signals under mismatched conditions. The method takes a signal (e.g., speech signal) and a set of stored representations (e.g., stored representations of keywords) and performs at least one transformation that results in the signal more closely emulating the stored representations. This is accomplished by using one of three techniques. First, one may transform the signal so that the signal may be better approximated by (e.g., is closer to) one of the stored representations. Second, one may transform the set of stored representations so that one of the stored representations better approximates the signal. Third, one may transform both the signal and the set of stored representations.

24 Claims, 3 Drawing Sheets

METHOD OF AND APPARATUS FOR SIGNAL RECOGNITION THAT COMPENSATES FOR MISMATCHING

GOVERNMENT CONTRACT

This invention was made with Government support under contract number MDA904-92-G-0329 awarded by the National Security Agency. The Government has certain rights in this invention.

FIELD OF THE INVENTION

The invention relates to signal recognition. More particularly, the invention relates to improving performance of automatic signal recognition systems that are adapted to be used in adverse environments.

BACKGROUND OF THE INVENTION

One type of signal recognition system is a speech recognition system.

A speech recognition system ("the system") is able to recognize a set of words in an input, i.e., speech, received from a speaker. Based upon the recognized input, a function is performed. If the system is used in a telephone network, the function may be, e.g., connecting the speaker to an operator.

The system has been previously trained to recognize each word in the set of words. Each individual word is called a keyword. The training may be done by inputting training speech and forming and storing models of the keywords.

Once trained, in operation, the system may be able to recognize a keyword contained within the input speech. The system does this by comparing the input speech with stored keyword models. If a keyword in the input speech is recognized, the system performs the function associated with the word.

Although known systems identify the keyword in the input speech with a fairly high level of accuracy, there is much room for improvement. The accuracy of systems may be measured by the system's "average word error rate." The "average word error rate" is a measure of how often the system identifies an incorrect keyword within an utterance containing a keyword or identifies a keyword when no keyword was uttered.

A factor that serves to lower the accuracy of the system is called a "mismatch." A mismatch may occur when the system is trained using one input system (e.g., a microphone and a cable) and used with another input system (e.g., a telephone handset and associated telephone network system). A mismatch is said to occur in this instance because a person's voice will exhibit different characteristics when passed through a microphone as opposed to a telephone system.

The accuracy problem, and in particular the mismatch problem, has received attention in the past. There have been at least three manners in which people have attempted to solve the mismatch problem.

First, some suggest solving the mismatch problem by training the system for each application depending upon the manner in which the speaker will provide input speech. This suggestion has two problems. First, training the system for each application is time consuming and expensive. Second, the system will still exhibit the effects of the mismatch problem if different speech input media (e.g., telephones and cellular phones) are capable of being used with the system.

Second, others suggest solving the mismatch problem by creating "pooled" models to use in the system. These are models that reflect an amalgam of effects of more than one input medium. This suggestion also has two problems. First, pooled models are more expensive to create than other models (and typically take more time also). Second, for any given input system, a model that is created based upon the input system will provide greater accuracy than a pooled model.

Third, others suggest solving the mismatch problem by adding an offset factor to the speech signal input into the system. The offset factor that is added represents an estimate of what is needed to offset the distortion encountered by the signal. This offset factor is determined by a codebook search. The codebook is comprised of numerous entries, typically 256. These entries represent offset values from a set of input systems. For example, the codebook may have 64 entries based upon a first type of input system (e.g., a first type of microphone and a first type of channel), a second 64 entries based upon a second type of input system, a third 64 entries based upon a third type of input system and a fourth 64 entries based upon a fourth type of input system. However, this suggestion also has a problem in that the input used may not be properly characterized by the set of 256 codebook entries if the input used for the speech signal is not the first, second, third, or fourth type of input system. This causes the speech recognition system to be less accurate.

Despite use of the above described methods, the average word error rate for recognition under mismatched conditions is still unsatisfactory for many applications. A solution to the mismatch problem is needed.

SUMMARY OF THE INVENTION

We have discovered a method for substantially reducing the average error rate for signals under mismatched conditions. The method takes a signal (e.g., speech signal) and a set of stored representations (e.g., stored representations of keywords) and performs at least one transformation that results in the signal more closely emulating the stored representations in a relative sense. Illustratively, this may be accomplished by using one of three techniques. First, one may transform the signal so that the signal may be better approximated by (e.g., is closer to) one of the stored representations. Second, one may transform the set of stored representations so that one of the stored representations better approximates the signal. Third, one may transform both the signal and the set of stored representations.

Advantageously, a system made in accordance with the present invention need not be trained for each individual application.

Also advantageously, a system made in accordance with the present invention provides greater accuracy than known systems that use pooled models and codebooks.

Other advantages of the present invention will become apparent from the description and drawings that follow.

DETAILED DESCRIPTION

The detailed description described herein is described in the context of practicing the invention in a speech recognition system. However, as will be readily apparent to those skilled in the art, the present invention may be used with any type of system (e.g., a facsimile system, a satellite system, an optical character recognition system, etc . . . ) in which a physical signal from a physical system is compared to a set of stored representations for purposes of recognition. Further, a version of a paper entitled "A Maximum Likelihood Approach to Stochastic Matching for Robust Speech Recognition" is provided later in this specification under the heading Additional Detailed Analysis. The description provided therein is intended only to be illustrative of the present invention.

For clarity of explanation, the illustrative embodiments of the present invention are presented as comprising individual functional blocks. The functions these blocks represent may be provided through the use of either shared or dedicated hardware, including, but not limited to, hardware capable of executing software. For example, the functions of blocks 200, 202, and 206 in FIG. 2 may be provided by a single shared processor. Use of the term "processor" should not be construed to refer exclusively to hardware capable of executing software.

Illustrative embodiments may comprise digital signal processor (DSP) hardware such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Prior to describing the present invention in the context of a speech recognition system, a known speech recognition system will be briefly described.

Figure 1:
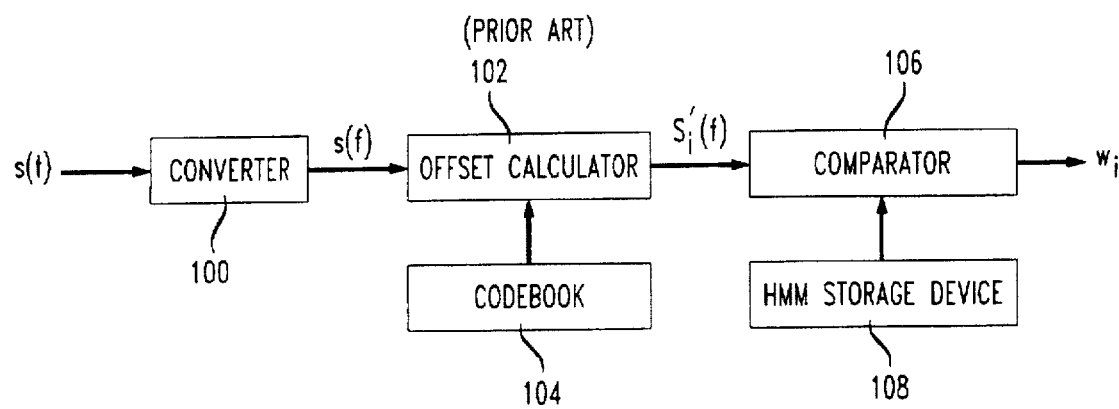
FIG. 1 shows a known system for addressing the mismatch problem.

Referring to FIG. 1, a speech signal, S(t), is input into a converter 100. Assume, for the sake of brevity, that S(t) is an utterance that contains one keyword and nothing else. The converter 100 converts speech signal S (t) into the frequency domain resulting in a signal S(f). S(f) is input into an offset calculator 102. The offset calculator 102 outputs $S_i'(f)$. $S_i'(f)$ is equal to S(f) plus an offset value, $OV_i$, stored in codebook 104. $S_i'(f)$ is input into a comparator 106 where it is compared with a set of hidden Markov models (HMMs) stored in an HMM storage device 108. Each HMM in the HMM storage device is an HMM for a keyword. After $S_i'(f)$ is compared to each HMM, the comparator 106 outputs a word represented by the HMM that best matches $S_i'(f)$. This word is denoted by $W_i$. This process is then repeated for each of the offset values in the codebook 104. For each $OV_i$, a new $W_i$ is determined by the comparator 106. Once a $W_i$ is determined for each offset value, $OV_i$, the $W_i$ with the highest likelihood score is chosen as being representative of the keyword contained in the utterance.

Having described a known system, the present invention will be described with reference to a speech recognition system in three different embodiments. The first embodiment transforms a representation (e.g., cepstrum representation) of the speech signal so that it more closely resembles at least one stored HMM. The second embodiment transforms stored HMMs to more closely resemble a representation of the speech signal. The third embodiment transforms both the signal and the set of stored representations so that a transformed signal more closely resembles at least one transformed HMM than the signal resembles the stored HMM.

Figure 2:
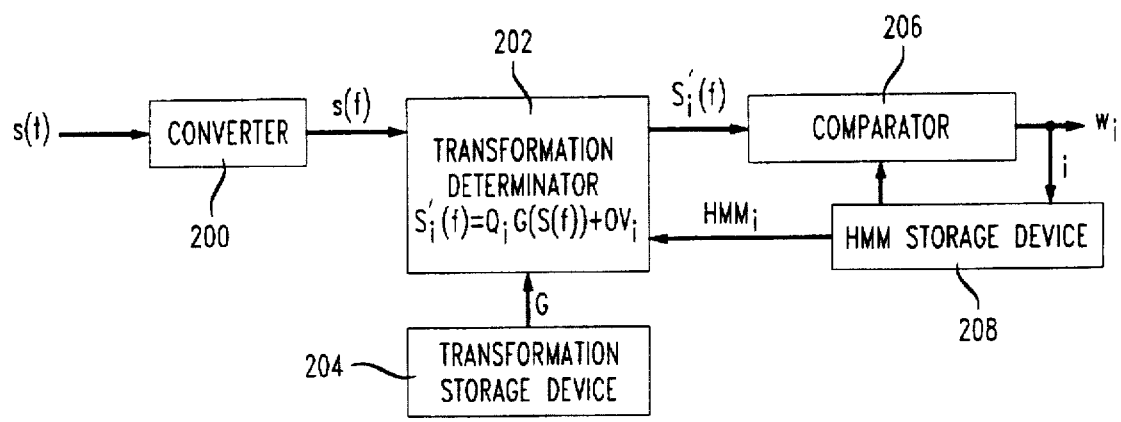
FIG. 2 shows a first illustrative example of a system made in accordance with the present invention.

Referring to FIG. 2, the first embodiment will be described. A speech signal, S(t), is input into a converter 200. In the speech recognition environment, the converter 200 may be any type of feature extraction device (e.g., a spectrum analysis device, a cepstrum analysis device, etc . . . ). Assume again, for the sake of brevity, that S(t) is an utterance that contains one keyword. The converter 200 converts the speech signal S(t) into the frequency domain resulting in a signal S(f). S(f) is input into a transformation processor 202. This may also be referred to as a transformation determinator as is done in FIGS. 2 and 3. The transformation processor 202 outputs $S_i'(f)$. $S_i'(f)$ is equal to $Q_i(G(S(f))$ plus an offset value, $OV_i$. $Q_i$ is a scale factor and G is a function of S(f) that is be stored in a transformation storage device 204. A "function" of S(f) is computed in the transformation processor. The function does necessarily not include $Q_i$. However, the "function" is broad enough to include at least three distinct formats. More specifically, the "function" may be of the form $Q_iG(S(f))$, $Q_iS(f)$, or $G(S(f))$. G may be any linear or non-linear function, the format of which is application dependent and is dependent upon factors including signal type, anticipated distortion, and feature extraction methods (e.g., cepstrum, spectrum, etc . . . ). The manner in which G changes based upon the above factors will be readily apparent to those skilled in the art. For example, if the signal type is speech, and the anticipated distortion is channel distortion in a telephone network, and the feature extraction method is cepstral analysis, then $G(x)=x$.

Again referring to FIG. 2, in order to identify the variable "i" an initial pass through of the system is required. During the initial pass through, $S_i'(f)$ equals S(f) (e.g., $Q_i=1$, $G(x)=x$, and $OV_i=0$) and a comparator 206 simply performs a comparison between S(f) and each HMM to determine a first set of likelihood values. Based upon the first set of likelihood values, a $W_i$ is determined. $W_i$ is the word that is represented by the HMM (i.e., $HMM_i$) that is closest to $S_i'(f)$ on the initial pass through.

Still referring to FIG. 2, after the initial identification, the transformation processor 202 receives $HMM_i$ from an HMM storage device 208. The HMM storage device 208 chooses $HMM_i$ because it was sent the index "i" from the comparator 206 after the initial identification. The transformation processor 202 uses S(f), $HMM_i$, and the input, G, from the transformation storage device to compute a function and determine the scale factor $Q_i$ and the offset value $OV_i$. $Q_i$ and $OV_i$ are determined in accordance with equations 32 and 33 presented later under "Additional Detailed Analysis". Since $OV_i$, $Q_i$, and G are now known, the transformation processor is capable of taking S(f) and transforming it into a new $S_i'(f)$ in accordance with the above described equation.

Again referring to FIG. 2, G is a portion of the function of S(f) described mathematically as $Q_iG(S(f))$. This is important because when the transformation (e.g., $S_i'(f)=Q_i(G(S(f))+OV_i)$ is determined by the transformation processor 202, items that need be "determined" are $Q_i$ and $OV_i$. Since there are two equations and two unknowns, $Q_i$ and $OV_i$ may be determined in either order (e.g., $Q_i$ first and $OV_i$ second or $OV_i$ first and $Q_i$). Determining the transformation may, in certain circumstances, be based upon a portion of the function (e.g., G) as opposed to the entire function (e.g., $Q_i$ and G) . For example, suppose the function is considered to be $Q_iG(S(f))$. This function could be computed. However, in determining the transformation by solving for $OV_i$ first and $Q_i$ second, at least part of the function (i.e., $Q_i$) is not necessary to determine the $OV_i$ portion of the transformation. Once $OV_i$ is determined, determining $Q_i$ is trivial and depends upon $OV_i$. Thus, the transformation may be determined based upon at least a portion of the function.

Again referring to FIG. 2, the new $S_i'(f)$ is compared with each HMM to determine a second set of likelihood values. Based upon the second set of likelihood values, a $W_i$ is determined. The new $W_i$ corresponds to a new $HMM_i$ which is the HMM closest to the new $S_i'(f)$. This process may, but need not be repeated depending upon the application. For example, the index "i" from the new $W_i$ may be passed to the HMM storage device 208 which identifies a next $HMM_i$. The next $HMM_i$ is input, along with S(f) and G, into the transformation processor. With this information, the transformation processor determines a next $Q_i$ and a next $OV_i$.

In some cases, based upon the second set of likelihood values, the new $S_i'(f)$ is identified as being most similar to a particular HMM. However, since the process described with respect to FIG. 2 may be repeated, there are other cases wherein additional iterations of the process may be desirable. In these cases, there are numerous manners in which one could decide how many iterations of the process to conduct. For example, one could decide not to conduct additional iterations if a particular $HMM_i$ scores above a certain threshold for the current $S_i'(f)$. One could also decide not to conduct more than a certain fixed number of iterations. One could also combine the above two techniques by conducting the fixed number of iteration only as long as there is no $HMM_i$ that scored above a certain threshold. There are numerous other techniques that may be used to decide how many iterations of the process to conduct that will be readily apparent to those skilled in the art.

Figure 3:
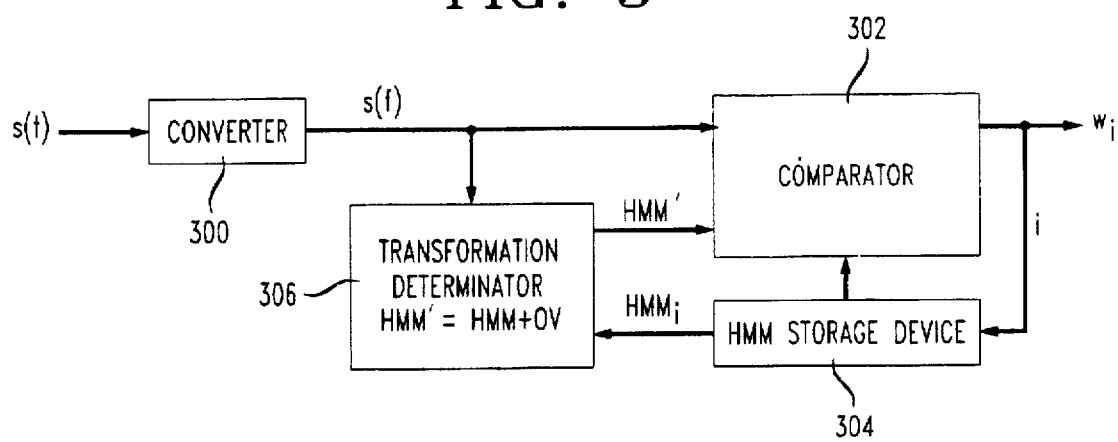
FIG. 3 shows a second illustrative example of a system made in accordance with the present invention.

Referring to FIG. 3, the second embodiment will be described. A speech signal, S(t), is input into a converter 300 to generate a frequency representation, S(f), of the speech signal. Assume again, for the sake of brevity, that S(t) is an utterance that contains one keyword. S(f) is input into a comparator 302. During an initial pass through the system, S(f) is compared to a set of HMMs (e.g. HMM'). HMM' is a set of HMMs that is based upon another set of HMMs stored on an HMM storage device 304. Each HMM in HMM' equals an HMM on the HMM storage device plus an offset value, OV. For the initial pass through, OV is set equal to zero. The initial pass through generates a first set of likelihood values. The word, $W_i$, that is represented by the particular HMM in HMM' that gives the highest likelihood score is identified. This HMM is, for example, the ith HMM in HMM'. Thus, $W_i$ represents the initial determination of a word that is closest to the speech signal, S(t).

The index (e.g., "i") of $W_i$ is input into the HMM storage device 304. The HMM storage device 304 identifies the ith MMM (i.e., $HMM_i$) and inputs it into a transformation processor 306. Based upon $HMM_i$ and S(f), the transformation processor 306 determines an offset value, OV. OV is determined based on $HMM_i$, S(f), and equations 47 and 49 presented later under "Additional Detailed Analysis". OV may also be determined based on $HMM_i$, S(f), and equations 53 and 54 presented later under "Additional Detailed Analysis". In general, the use of equations 47 and 49 are computationally slightly more efficient and slightly less effective than the use of equations 53 and 54.

The offset value is added to each HMM on the HMM storage device to generate a new set of HMMs (i.e., a new HMM'). This is done in transformation processor 306. Thus, the set of stored HMMs in the HMM storage device 304 has been transformed to generate a transformed set of HMMs (i.e., the new HMM').

The new HMM' is compared to S(f) in the comparator 302. This comparison generates a second set of likelihood values. Based upon the second set of likelihood values, a $W_i$ is determined. The new $W_i$ corresponds to an HMM in the new HMM'. This process may, but need not, be repeated depending upon the application.

Additional iterations of the process may be desirable. In these cases, there are numerous manners in which one could decide how many iterations of the process to conduct as will be readily apparent to those skilled in the art.

Figure 4:
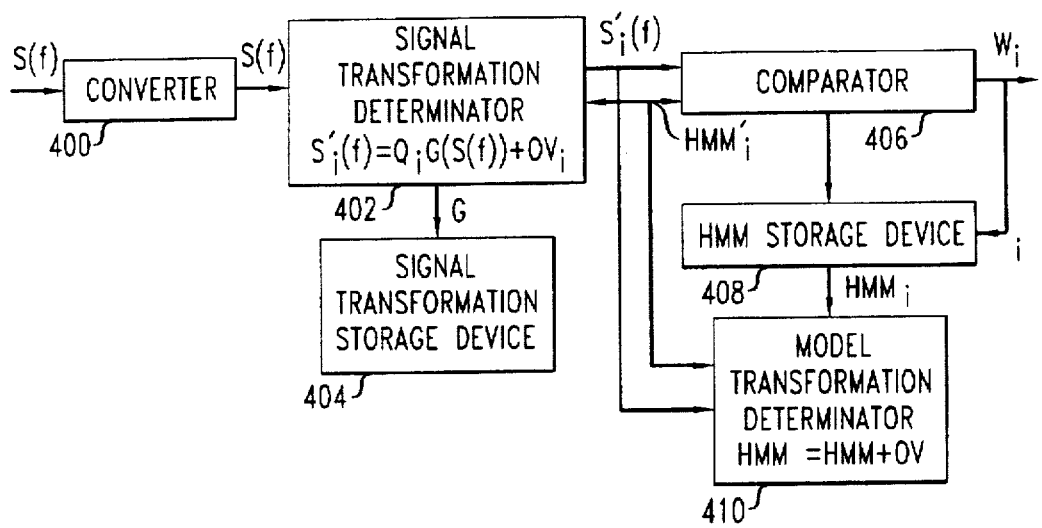
FIG. 4 shows a third illustrative example of a system made in accordance with the present invention.

The third embodiment uses techniques from both the first embodiment and the second embodiment. Thus, the third embodiment will now be described with reference to FIGS. 2, 3 and 4. (FIG. 4 shows the third embodiment which comprises a combination of the components of the first embodiment shown in FIG. 2 and the second embodiment shown in FIG. 3. In particular, converter 400 of FIG. 4 corresponds to both converter 200 of FIG. 2 and converter 300 of FIG. 3; signal transformation processor 402 of FIG. 4 corresponds to transformation processor 202 of FIG. 2; signal transformation storage device 404 corresponds to transformation storage device 204 of FIG. 2; comparator 406 of FIG. 4 corresponds to a combination of comparator 206 of FIG. 2 and comparator 302 of FIG. 3; HMM storage device 408 of FIG. 4 corresponds to HMM storage device 304 of FIG. 4; and model transformation processor 410 of FIG. 4 corresponds to transformation processor 306 of FIG. 3.)

The third embodiment uses an iterative method to move the signal and at least one HMM in a set of stored HMMs closer to each other.

Referring to FIG. 4, S(t) is input into converter 400, the function S'(f) is calculated in the signal transformation processor 402, and comparator 406 performs a comparison of $S_i'(f)$ {$S_i'(f)=S(f)$ for the first pass} and each HMM to determine a first set of likelihood values upon which $W_i$ is determined. Thus, the initial identification process is analogous to that described for FIG. 2 ("FIG. 2-type processing"). Index "i" is sent to HMM storage device 408. $HMM_i$ is input to model transformation processor 410, and in a manner analogous to the processing described for FIG. 3 ("FIG. 3-type processing"), determines HMM'. Thus, the third exemplary embodiment combines features of both the first and second exemplary embodiments.

The process executed by a system made in accordance with the third exemplary embodiment may now be complete if only one iteration is desired. If, however, additional iterations are desirable based upon the application, the new $W_i$ will send the new "i" index to the HMM storage device 408 which now operates analogously to the HMM storage device 208 of FIG. 2. The system would then execute FIG. 2-type processing to generate a current $W_i$. The "i" value associated with the current $W_i$ may then be sent back to HMM storage device 408, which then operates analogously to the HMM storage device 304 of FIG. 3.

The aformentioned iterative process may contine as long as desired. In cases where such additional iterations are desired, there are numerous ways for deciding how many process iterations to conduct, as will be readily apparent to those skilled in the art. Moreover, regardless of the number of iterations performed, the third exemplary embodiment described in conjunction with FIG. 4 may be implemented by performing either of the processing described as analogous to FIG. 2 or FIG. 3 first.

Furthermore, an iteration may be performed in a variety of manners. For example, in the embodiment described above, the initial identification procedure is performed by transforming a representation of the speech signal to more closely resemble a stored HMM, i.e., processing S(f) in signal transformation determinator 402 (FIG. 2-type processing), and then followed with transformation of stored HMMs in model transformation processor 410 (FIG. 3-type processing). In other embodiments, this order can be reversed, i.e., transform stored HMMs and then transform a representation of the speech signal.

Moreover, the exemplary embodiment described above in conjunction with FIG. 4 used FIG. 2-type processing for initial identification, followed by FIG. 3-type processing, then additional iterations using FIG. 2-type processing. In alternative embodiments, after initial identification using FIG. 2-type processing, $HMM_i$ could be returned to the signal transformation determinator 402 to determine a new $S_i'(f)$, rather than using $HMM_i$ to determine a new HMM' (FIG. 3-type processing). After the initial identification process and further processing are performed with FIG. 2-type processing, FIG. 3-type processing can be used. Or, FIG. 3-type processing can be used for the initial identification process and further processing, followed by FIG. 2-type processing.

While the invention has been described with respect to a speech recognition system, as will be readily apparent to those skilled in the art, the present invention may be used with any type of system in which a physical signal is compared to a set of stored representations, including but not limited to a facsimile recognition system, a satellite transmission/recognition system, speaker recognition systems, signature recognition systems, and an optical character recognition system and other image and/or audio recognition systems. Further, each stored representation may have a corresponding operation that is performed if the stored representation is identified as being similar to the signal. The operation is application dependent and may be, for example, connecting a caller to an operator in a telephone network. Those skilled in the art will realize that there are numerous operations that may be performed depending upon the application. Finally, while the systems described have focused on the stored models representing words, those skilled in the art will realize that the stored models may be models of phonemes and/or other elements of speech or data, depending upon the application.

Additional Detailed Analysis

1. Introduction

Recently there has been much interest in the problem of improving the performance of automatic speech recognition (ASK) systems in adverse environments. When there is a mismatch between the training and testing environments, ASR systems suffer a degradation in performance. The goal of robust speech recognition is to remove the effect of this mismatch so as to bring the recognition performance as close as possible to the matched conditions. In speech recognition, the speech is usually modeled by a set of hidden Markov models (HMM) $\Lambda_X$. During recognition the observed utterance Y is decoded using these models. Due to the mismatch between training and testing conditions, this often results in a degradation in performance compared to the matched conditions.

Figure 5:
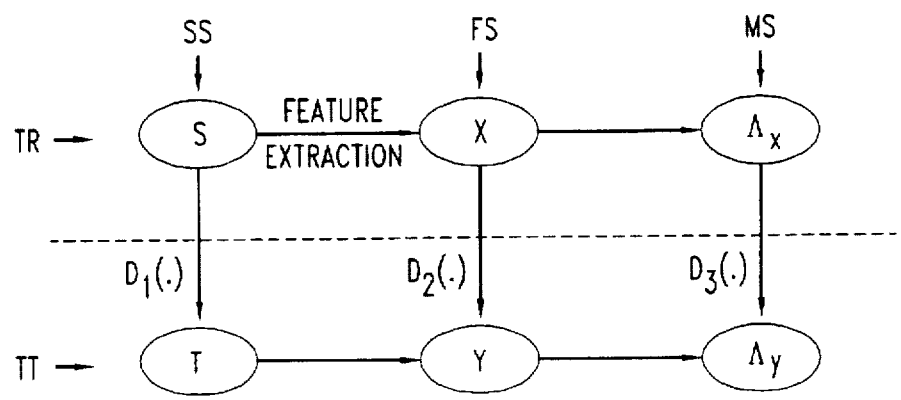
FIG. 5 shows a mismatch between training and testing conditions in signal-space, feature-space and model-space.

The mismatch between training TR and testing TT conditions can be viewed in the signal-space SS, the feature-space FS, or the model-space MS as shown in FIG. 5. In FIG. 5, S denotes the raw speech in the training environment. The mismatch between the training and testing environments is modeled by the distortion $D_1$ which transforms S to T. In speech recognition, some form of feature extraction is first carried out. These features are referred to as X in the training environment and Y in the testing environment. The mismatch between the two environments in the feature space is modeled by the function $D_2$ which transforms the features X to the features Y. Finally, the features X are used to build models $\Lambda_X$. The mismatch between the training and testing environments can be viewed in the model space as the transformation $D_3$ that maps $\Lambda_X$ to $\Lambda_Y$. Some sources of mismatch include additive noise, channel and transducer mismatches which contribute a spectral tilt and a spectral shaping, speaker mismatch, different accents, stress, and different speaking styles. Much of the recent work has been concentrated on the problems of additive noise and channel effects.

Methods used to combat noise generally fall into three broad categories. In the first class of approaches, robust signal processing is used to reduce the sensitivity of the features to possible distortions. One approach involves spectral shaping such as liftering. Here the idea is to deemphasize lower and higher order cepstral components because they have been found to be sensitive to channel and additive noise effects. Methods based on subtracting the long-term cepstral mean from the utterance have also been proposed. This idea is commonly used to remove mismatches due to channels. Also in this class is a method wherein the spectral sequence is high-pass filtered to remove the effect of slowly varying channels. In methods based on auditory modeling, signal processing is used that attempts to mimic the processing of the human ear in the hope that this will result in more robust features. The use of a signal-limiting preprocessor which can reduce the effect of noise on the speech features is known. Another approach to reducing the effect of noise is to inject a fraction of the ambient noise into the training data and retrain the system. This technique is similar to dithering. There are also methods based on spectral subtraction, where an estimate of the noise power spectrum is subtracted from each speech frame. This first class of approaches may be viewed as operating in the feature-space (FIG. 5) as they generally involve some form of robust feature preprocessing.

In the second set of methods, some optimality criterion is used to form an estimate of a function of the clean speech. Formulations based on a minimum mean square error (MMSE) estimate of functions of the speech spectrum where the corrupting noise was assumed to be an independent Guassian process are known. Furthermore, each spectral bin was estimated separately, since it was assumed that the individual bins were independent. The correlation between separate spectral bins was modeled, where the speech distribution was modeled as a mixture of Guassians, with a diagonal covariance matrix for each mixture. Finally the temporal structure of speech was considered by modeling the speech by a hidden Markov model (HMM). These approaches may be viewed either in the signal-space for speech enhancement, or in the feature-space for spectral compensation, depending on which representation is being estimated.

In the third set of methods, the noise is modeled and directly incorporated into the recognition process. One approach to this is based on noise masking. Here the idea is to replace any filter bank energy by an appropriate noise level, if the signal energy falls below the noise level. Thus any information that is highly corrupted by noise is ignored. Such noise masking schemes can be incorporated into an HMM speech recognizer. In another approach called model decomposition, separate speech and noise HMMs are trained from training data. During recognition, the viterbi search is carried out in the combined state-space of the two models. This method has been shown to perform quite well, though it is necessary to have accurate models for both the speech and noise. The model decomposition approach is similar to the abovementioned approach. However, the original speech parameters are estimated from the noisy speech during recognition. The problem of estimating the original speech parameters from noisy data was further studied, where a more general interaction between the signal and noise models was allowed. In this case and at lease one other, the signal is assumed to be modeled as a mixture of Guassians. In yet another method in this framework, maximum-likelihood (ML) estimates of the energy contours for the training speech were used to normalize the speech before estimating the HMM parameters. During testing, ML estimates of the clean gain parameters were computed from the noisy speech, which were then used to normalize the parameters of the speech model. A minimax approach to robust speech recognition is known wherein the recognizer is made more robust by allowing its HMM parameters to occupy some neighborhood of the values that were estimated during training. These set of approaches may be viewed as operating in the model-space to deal with the possible distortions in the models as shown in FIG. 5.

There is some recent work on speaker and channel adaptation where a fixed bias is estimated that transforms each individual speaker to a reference speaker and then the estimated bias is subtracted from every frame of speech. A similar approach has been used for estimating channel mismatch in speech recognition where the speech is modeled by a vector quantization (VQ) codebook. Another approach to estimate channel mismatch has been proposed, where the estimation is based on the difference between the average log-spectra of the two channels.

Disclosed is an ML approach to stochastic matching for robust speech recognition. The method works by using an ML approach to reduce the mismatch between the observed utterance and the original speech models during recognition of the utterance. This mismatch may be reduced in at least two ways. First, one may map the distorted features Y to an estimate of the original features X so that the original models $\Lambda_X$ can be used for recognition. Secondly, one may map the original models Ax to the transformed models $\Lambda_Y$ which better match the observed utterance Y. The first mapping operates in the feature-space, whereas the second operates in the model-space (see FIG. 5). These mappings are denoted as $F_v(Y)$ in the feature-space, and $G_\eta(\Lambda_X)$ in the model-space, where v and η are parameters to be estimated. The functional form of these mappings depends on our prior knowledge of the nature of the acoustic mismatch. The parameters, v or η, of these functions are then estimated so as to maximize the likelihood of the observed speech Y given the models $\Lambda_X$, thus decreasing the mismatch due to the distortion. It is intuitively appealing to use the HMM's $\Lambda_X$ as the speech models for estimating the parameters, v and η, since the goal is to reduce the mismatch for improved recognition, and $\Lambda_X$ are the models used for recognition. The ML parameter estimation is solved using the expectation-maximization (EM) algorithm to iteratively improve the likelihood. Since the stochastic matching algorithm operates only on the given test utterance and the given set of speech models, no training is required for the estimation of the mismatch prior to actual testing. The above two methods may be used in conjunction to form a third method to reduce mismathc effect.

Experimental results are presented to show the efficacy of the approach to improve the performance of a continuous speech recognition system in the presence of mismatch due to different transducers and channels. This mismatch is modeled both as a fixed bias (in the feature space), and as a random bias (in the model space). The proposed approach reduced the word error rate by about 70% in mismatched conditions and maintained performance under matched conditions. The algorithm was also found to converge fast (within two iterations).

The remainder of this paper is organized as follows. In Section 2, a general framework for the maximum likelihood estimation of the parameters of the transformations $F_v(.)$ and $G_\eta(.)$. In Section 3 the case of the feature-space transformation is provided. In particular, expressions for the estimates of the parameters of an inverse distortion function that is linear in the unknown parameters, but non-linear in the observations is derived. As a special case, an additive bias model is considered. In Section 4, the transformation is viewed in the model-space. In particular, we consider the case of a random additive bias distortion.

2. The Stochastic Matching Framework

In pattern recognition, given a set of trained models $\Lambda_X=\{\lambda_{xi}\}$ where $\lambda_{xi}$ is the model of the ith class, and a set of test data $Y=\{y_1, y_2, \ldots, y_T\}$, one wants to recognize the sequence of events $W=\{W_1, W_2, \ldots, W_L\}$ embedded in Y. For continuous speech recognition, $\lambda_{xi}$, may correspond to the ith subword HMM unit, and Y to a particular test utterance. W could be the decoded phone or word sequence. In training the models $\Lambda_X$, one is limited to a set of training data. Unfortunately, there may be a mismatch between this training data and the test data Y which results in errors in the recognized sequence W. This mismatch can be viewed in the original signal-space, the feature-space or in the model-space as shown in FIG. 5. In the figure, the functions D(.) map the original space to the corresponding distorted space. The sources of mismatch can be a distortion in the signal, incomplete characterization of the signal, insufficient amount of training data, or modeling inadequacy and estimation errors. In this paper, the problem of speech recognition performance degradation due to mismatch in the training and test speech data is addressed. This mismatch could be due to microphone and channel mismatch, different environments for training and testing, different speakers and speaking styles or accents, or any combination of these.

In speech recognition, the models $\Lambda_X$ are used to decode Y using the maximum a posteriori (MAP) decoder $$W'=\mathrm{argmax}_W p(Y|W,\Lambda_X)P(W) \quad (1)$$

where the first term is the likelihood of observing Y given that the word sequence is W, and the second term is the a priori probability of the word sequence W. This second term is called the language model which imposes constraints on the set of allowable word sequences. Due to the mismatch between training and testing environments, there is a corresponding mismatch in the likelihood of Y given $\Lambda_X$ evaluated by Equation 1, thus causing errors in the decoded sequence W'. Decreasing this mismatch will improve the recognition performance.

In the feature-space, let the distortion function map the original utterance $X=\{x_1, x_2, \ldots, x_T\}$ into the sequence of observations $Y=\{y_1, y_2, \ldots, y_T\}$. If this distortion is invertible, one may map Y back to the original speech X with an inverse function $F_v$, so that $$X = F_v(Y) \quad (2)$$

where $v$ are the parameters of the inverse distortion function. Alternately, in the model-space consider the transformation $G_\eta$ with parameters $\eta$ that maps $\Lambda_x$ into the transformed models $\Lambda_y$ so that $$\Lambda_y = G_\eta(\Lambda_x) \quad (3)$$

One approach to decreasing the mismatch between $Y$ and $\Lambda_x$ is to find the parameters $v$ or $\eta$, and the word sequence $W$ that maximize the joint likelihood of $Y$ and $W$ in Equation 1 given the models $\Lambda_x$. Thus in the feature-space, we need to find $v$ such that $$(v', W') = \mathrm{argmax} \, p/(v,W)(Y,W|v,\Lambda_x) \quad (4)$$

which is equivalent to $$(v', W') = \mathrm{argmax} \, p/(v,W)(Y|W,v,\Lambda_x) P(W) \quad (5)$$

Correspondingly, in the model-space, we need to find $\eta'$ such that $$(\eta', W') = \mathrm{argmax} \, p/(\eta,W)(Y,W|\eta,\Lambda_x) \quad (6)$$

which is equivalent to $$(\eta', W') = \mathrm{argmax} \, p/(\eta,W)(Y|W,\eta,\Lambda_x) P(W) \quad (7)$$

Figure 6:
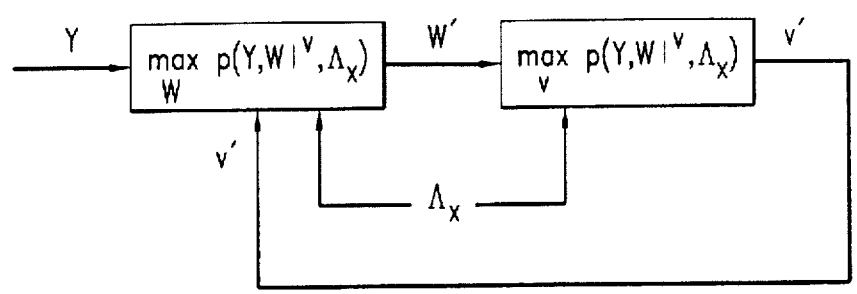
FIG. 6 shows joint maximization of Equation 5 for feature-space.
Figure 7:
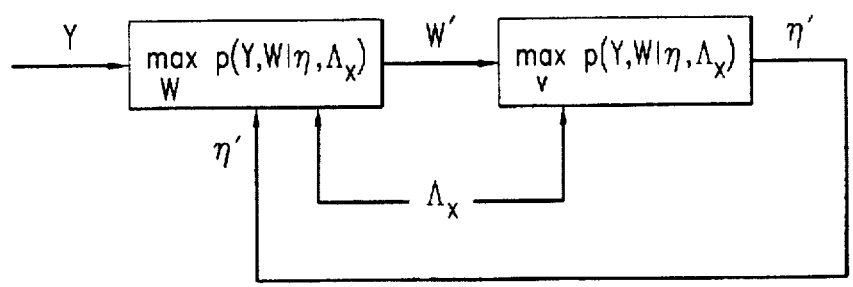
FIG. 7 shows joint maximization of Equation 7 for model-space.

This joint maximization over the variables $v$ and $W$ in Equation 5 or over $\eta$ and $W$ in Equation 7 may be done iteratively by keeping $v$ or $\eta$ fixed and maximizing over $W$, and then keeping $W$ fixed and maximizing over $v$ or $\eta$. This procedure is conceptually shown in FIG. 6 for the feature-space and in FIG. 7 for the model-space.

The process of finding $W$ has been treated by many researchers. The problem of finding the parameters $v$ and $\eta$ is of interest. To simplify expressions, one may remove the dependence on $W$, and write the maximum-likelihood estimation problem corresponding to Equations 5 and 7 as $$v' = \mathrm{argmax} \, p/v(Y|v,\Lambda_x) \quad (8)$$

and $$\eta' = \mathrm{argmax} \, p/\eta(Y|\eta,\Lambda_x) \quad (9)$$

For this study, assume that $\Lambda_x$ is a set of left to right continuous density subword HMMs. The transition probability from state $i$ to $j$ is denoted by $a_{i,j}$ for $i,j = 1, \ldots, N$, and the observation density $p_x(x|i)$ for state $i$ is assumed to be a mixture of Guassians, given by $$p_x(x|i) = \sum_{j=1}^{M} w_{i,j} N(x; \mu_{i,j}, C_{i,j}), \quad (10)$$

where $M$ is the number of mixtures, $w_{i,j}$ is the probability of mixture $j$ in state $i$, and $N$ is the normal distribution given by $$N(x; \mu_{i,j}, C_{i,j}) = \frac{1}{(2\pi)^{\frac{D}{2}} |C_{i,j}|^{\frac{1}{2}}} \exp\left(-\frac{1}{2}(x-\mu_{i,j})^T C_{i,j}^{-1}(x-\mu_{i,j})\right), \quad (11)$$

where $D$ is the dimension of the feature vector $x$, and $C_{i,j}$ and $\mu_{i,j}$ are the covariance matrix and mean vector corresponding to mixture $j$ in state $i$.

Let $S = \{s_1, s_2, \ldots, s_T\}$ be the set of all possible state sequences for the set of models $\Lambda_x$ and $C = \{c_1, c_2, \ldots, c_T\}$ be the set of all mixture component sequences. Then Equation 8 can be written as $$v' = \mathrm{argmax}_v \, p(Y|v, \Lambda_x) = \mathrm{argmax}_v \, \sum_S \sum_C p(Y, S, C|v, \Lambda_x). \quad (12)$$

Similarly, one may write Equation 9 as $$\eta' = \mathrm{argmax}_\eta \, \sum_S \sum_C p(Y, S, C|\eta, \Lambda_x). \quad (13)$$

In general, it is not easy to estimate $v'$ or $\eta'$ directly. However, for some $F_v$ and $G_\eta$, one can use the EM algorithm to iteratively improve on a current estimate and obtain a new estimate such that the likelihoods in Equations 12 and 13 increase at each iteration. In the next two sections, the application of the EM algorithm to find the estimates of the parameters $v$ of the feature-space transformation $F_v$, and the parameters $\eta$ of the model-space transformation $G_\eta$ are discussed respectively.

3. Estimation of Feature-Space Transformation $F_v$

In this section the EM algorithm is used to find the estimates $v'$ of Equation 8. The EM algorithm is a two-step iterative procedure. In the first step, called the expectation step (E step), one computes the auxiliary function given by $$\begin{aligned} Q(v'|v) &= E\{\log p(Y,S,C|v',\Lambda_x)|Y,v,\Lambda_x\} \\ &= \sum_S \sum_C p(Y,S,C|v,\Lambda_x) \log p(Y,S,C|v',\Lambda_x). \end{aligned} \quad (14)$$

In the second step, called the maximization step (M step), one finds the value of $v'$ that maximizes $Q(v'|v)$, i.e.

$$v' = \mathrm{argmax} \, Q/v'(v'|v) \quad (15)$$

It can be shown that if $Q(v'|v) \geq Q(v|v)$ then $p(Y|v', \Lambda_x) \geq p(Y|v, \Lambda_x)$. Thus iteratively applying the E and M steps of Equations 14 and 15 guarantees that the likelihood is non-decreasing. The iterations are continued until the increase in the likelihood is less than some predetermined threshold.

In general, the function $F_v(.)$ of Equation 2 can map a block of $Y$ into a block of $X$ of different size. However, for simplicity, assume that the function is such that it maps each frame of $Y$ onto the corresponding frame of $X$, so that $$x_t = f_v(y_t) \quad (16)$$

With $\Lambda_x$ given by the continuous density HMMs as described before, one may rewrite the auxiliary function as $$Q(v'|v) = \sum_S \sum_C p(Y,S,C|v,\Lambda_x) \log \prod_{t=1}^{T} a_{s_{t-1},s_t} w_{s_t,c_t} p_y(y_t|s_t,c_t,v',\Lambda_x) \quad (17)$$

where $p_y(y_t|s_t,c_t,v',\Lambda_x)$ is the probability density function of the random variable $y_t$. This can be derived from the density function of the random variable $x_t$, given by Equation 11, and the relation $x_t = f_v(y_t)$. One may write the density of $y_t$ as $$p_y(y_t|s_t,c_t,v,\Lambda_x) = \frac{N(f_v(y_t); \mu_{s_t,c_t}, C_{s_t,c_t})}{|J_v(y_t)|}, \quad (18)$$

where $J_v(y_t)$ is the Jacobian matrix whose $(i,j)$th entry is given by $$J_{v,i,j} = \frac{\partial y_{t,i}}{\partial f_{v,j}(y_t)}, \quad (19)$$

where $y_{t,i}$ is the $i$th component of $y_t$ and $f_{v,j}(y_t)$ is the $j$th component of $f_v(y_t)$. One may now rewrite Equation 17 as $$Q(v'|v) = \sum_S \sum_C p(Y,S,C|v,\Lambda_X) \cdot \quad (20)$$

$$\sum_{t=1}^{T} \left\{ \log a_{s_{t-1},s_t} + \log w_{s_t,c_t} + \log \frac{N(f_{v'}(y_t);\mu_{s_t,c_t},C_{s_t,c_t})}{|U_{v'}(y_t)|} \right\}$$

which may be written as $$Q(v'|v) = \sum_{n=1}^{N} p(Y, s_1 = n|v,\Lambda_X) \log a_{s_0,n} + \quad (21)$$

$$\sum_{t=2}^{T} \sum_{n=1}^{N} \sum_{l=1}^{N} p(Y, s_t = n, s_{t-1} = l|v,\Lambda_X) \log a_{l,n} +$$

$$\sum_{t=1}^{T} \sum_{n=1}^{N} \sum_{m=1}^{M} p(Y, s_t = n, c_t = m|v,\Lambda_X) \log w_{n,m} +$$

$$\sum_{t=1}^{T} \sum_{n=1}^{N} \sum_{m=1}^{M} p(Y, s_t = n, c_t = m|v,\Lambda_X) \log N(f_{v'}(y_t);\mu_{n,m},C_{n,m}) -$$

$$\sum_{t=1}^{T} \sum_{n=1}^{N} \sum_{m=1}^{M} p(Y, s_t = n, c_t = m|v,\Lambda_X) \log |U_{v'}(y_t)|.$$

Here $\alpha_{s_0,n}$ is the initial probability for state n. In computing the auxiliary function of Equation 21, one is only interested in the terms involving v'. Thus, using Equation 11, one may write the auxiliary function as $$Q(v'|v) = \sum_{t=1}^{T} \sum_{n=1}^{N} \sum_{m=1}^{M} \gamma_t(n,m) \left[ -\frac{1}{2} (f_{v'}(y_t) - \mu_{n,m})^T C_{n,m}^{-1}(f_{v'}(y_t) - \mu_{n,m}) - \log|U_{v'}(y_t)| \right] \quad (22)$$

where $\gamma_t(n,m) = p(Y, s_t = n, c_t = m|v, \Lambda_X)$ is the joint likelihood of Y and mixture m from state n producing the observation $y_t$. One may compute the probability $\gamma_t(n, m)$ using the forward-backward algorithm as $$\gamma_t(n,m) = \alpha_t(\eta)\beta_t(n) \frac{w_{n,m}N(f_{v'}(y_t);\mu_{n,m},C_{n,m})}{\sum_{j=1}^{M} w_{n,j}N(f_{v'}(y_t);\mu_{n,j},C_{n,j})}, \quad (23)$$

where $$\alpha_t(n) = p(y_1, y_2, \ldots, y_t, s_t = n|v, \Lambda_X) \quad (24)$$

$$\beta_t(n) = p(y_{t+1}, y_{t+2}, \ldots, y_T, s_t = n, \Lambda_X) \quad (25)$$

The forward-backward algorithm can be used to iteratively compute $\alpha_t(n)$ and $\beta_t(n)$.

In order to find the maximum of Q(v'|v) with respect to v', one may use any hill climbing technique such as the gradient ascent algorithm. However, for some cases, an explicit solution can be derived by differentiating the right hand side of Equation 22 with respect to v' and solving for its zeros, i.e., one finds v' such that $$\frac{\partial}{\partial v'} \sum_{t=1}^{T} \sum_{n=1}^{N} \sum_{m=1}^{M} \gamma_t(n,m) \left[ -\frac{1}{2} (f_{v'}(y_t) - \mu_{n,m})^T C_{n,m}^{-1}(f_{v'}(y_t) - \mu_{n,m}) - \log|U_{v'}(y_t)| \right] = 0. \quad (26)$$

The EM algorithm to maximize the likelihood in Equation 8 proceeds by computing Q(v'|v) from Equation 22 (the E step), and then finding v' from Equation 26 (the M step). This value is then substituted for v in Equation 22, and the algorithm proceeds iteratively.

In analogy with the segmental k-means algorithm, one may use a segmental ML approach to maximize the joint likelihood of the observations and the state sequence S,p(Y, S|v,$\Lambda_X$) instead of directly maximizing the likelihood p(Y|v, $\Lambda_X$) in Equation 12. The iterative estimation procedure now becomes $$S^i = \text{argmax} p/S(Y, S|v^i, \Lambda_X) \quad (27)$$

$$v^{i+1} = \text{argmax} p/v(Y, S^i|v, \Lambda_X) \quad (28)$$

Thus one first finds the most likely state sequence $S^i$, and then finds $v^{i+1}$ to maximize the likelihood of the utterance Y conditioned on this state sequence. The Viterbi algorithm may be used to find the optimal state sequence $S^i$, and the EM algorithm may be used to find $v^{i+1}$. It is easy to show that the EM procedure described above still holds, except that now $\gamma_t(n,m)$ is defined by $$\gamma_t(n,m) = \begin{cases} \dfrac{w_{n,m}N(f_{v'}(y_t);\mu_{n,m},C_{n,m})}{\sum_{j=1}^{M} w_{n,j}N(f_{v'}(y_t);\mu_{n,j},C_{n,j})} & \text{if } s_t^i = n \\ 0 & \text{otherwise.} \end{cases} \quad (29)$$

For the sake of simplicity, assume that $\theta_v(y_t)$ operates separately on each component, i.e., $x_{t,i} = f_{v,i}(y_{t,i})$, and that the covariance matrices $C_{n,m}$ are diagonal, i.e., $C_{n,m} = \text{diag}(\sigma_{n,m}^2)$. In what follows, for ease of the expressions, the reference to the subscript i denoting the ith component of the vectors is dropped. Consider functions of the form $$f_v(y_t) = ag(y_t) + b_1 \quad (30)$$

where $g(y_t)$ is a known (possibly non-linear) differentiable function of $y_t$, and $v = \{a, b\}$ is the set of unknown parameters.

The auxiliary function of Equation 22 can now be written as $$Q(a',b'|a,b) = \quad (31)$$

$$\sum_{t=1}^{T} \sum_{n=1}^{N} \sum_{m=1}^{M} \left[ -\frac{1}{2} \frac{(a'g(y_t) + b' - \mu_{n,m})^2}{\sigma_{n,m}^2} + \log a' \right].$$

Taking the derivative of Equation 31 with respect to a' and b' respectively and setting to zero, we get $$\sum_{t=1}^{T} \sum_{n=1}^{N} \sum_{m=1}^{M} \gamma_t(n,m) \left[ \frac{1}{a'} - \frac{(a'g(y_t) + b' - \mu_{n,m})g(y_t)}{\sigma_{n,m}^2} \right] = 0, \quad (32)$$

and $$\sum_{t=1}^{T} \sum_{n=1}^{N} \sum_{m=1}^{M} \gamma_t(n,m)[(a'g(y_t) + b' - \mu_{n,m})/\sigma_{n,m}^2] = 0. \quad (33)$$

one may solve equation 32 and 33 explicitly for the estimates a' and b'.

Now consider a specific case of Equation 30 corresponding to an additive bias $b_t$ so that $$x_t = y_t - b_t \quad (34)$$

One can see that if a=1, $g(y_t)$ and b=$-b_t$, for each component, then Equation 34 is equivalent to Equation 30. If the observations are in the spectral domain, then $b_t$ can be interpreted as an additive noise spectrum, whereas if the observations are in the cepstral or log-energy domains then $b_t$ corresponds to a convolutional filtering effect due to, for example, transducers or channels.

One may model the bias $b_t$ as either fixed for an utterance or varying with time. Some examples of a time-varying bias are a piecewise-constant bias, or a signal state-dependent bias. Alternatively one may model the bias stochastically in which case the distortion is viewed in the model-space as detailed in Section 4. In this section the cases of a state-dependent bias and a fixed bias are addressed.

Consider first the state-dependent case, in which the bias is varying from one HMM state to another. Suppose each speech state n has associated with it a specific bias term $b_n$. One may write the auxiliary function of Equation 22 as $$Q(b'|b) = \sum_{t=1}^{T} \sum_{n=1}^{N} \sum_{m=1}^{M} \gamma(n,m) \left[ -\sum_{i=1}^{D} \frac{(y_{t,i} - b'_{n,i} - \mu_{n,m,i})^2}{2\sigma_{n,m,i}^2} \right], \quad (35)$$

where $b = \{b_1, \ldots, b_n, \ldots, b_N\}$. The reestimation procedure of Equation 26 requires computing the derivative of Equation 35 with respect to $b'_{n,i}$ and equating to zero. This results in $$\sum_{t=1}^{T} \sum_{m=1}^{M} \gamma(n,m)(y_{t,i} - b'_{n,i} - \mu_{n,m,i})/\sigma_{n,m,i}^2 = 0, \quad (36)$$

which gives $$b'_{n,i} = \frac{\sum_{t=1}^{T} \sum_{m=1}^{M} \gamma(n,m)(y_{t,i} - \mu_{n,m,i})/\sigma_{n,m,i}^2}{\sum_{t=1}^{T} \sum_{m=1}^{M} \gamma(n,m)/\sigma_{n,m,i}^2}. \quad (37)$$

For the case of a single fixed bias b, we may similarly show that $$b'_i = \frac{\sum_{t=1}^{T} \sum_{n=1}^{N} \sum_{m=1}^{M} \gamma(n,m)(y_{t,i} - \mu_{n,m,i})/\sigma_{n,m,i}^2}{\sum_{t=1}^{T} \sum_{n=1}^{N} \sum_{m=1}^{M} \gamma(n,m)/\sigma_{n,m,i}^2}. \quad (38)$$

One sees from Equation 37 that estimation problems may arise due to small sample effects if there are many state-dependent bias terms to be estimated. However in some situations a state-dependent bias is meaningful. As an example, an additive cepstral bias model for linear filtering is only valid for high signal to noise ratios (SNR). When the SNR, is low, the noise dominates, and the additive bias model for channel filtering is inaccurate. One way to handle this is to assume that the bias is SNR dependent, and estimate a different bias according to different SNR ranges. One implementation of such an approach to estimate a separate bias for speech and background segments. This was found to be useful for the case where part of the mismatch was caused by a telephone channel. This is probably due to additive noise present in the telephone channel.

4. Estimation of Model-Space Transformation $G_\eta$

In the previous section, the distorted speech was assumed to be a fixed function of the original speech. In this section the distortion is considered to be random and hence view it in the model-space. Thus the distortion transforms the original model $\Lambda_X$ to the distorted model $\Lambda_y$ (see FIG. 5).

Let the observation sequence $Y = \{y_1, \ldots, y_T\}$ be related to the original utterance $X = \{x_1, \ldots, x_T\}$ and the distortion sequence $B = \{b_1, \ldots, b_T\}$ by $$y_t = f(x_t, b_t) \quad (39)$$

Then, if $x_t$ and $b_t$ are independent, onecan write the probability density function (pdf) of $y_t$ as $$p(y_t) = \int\int_{H_t} p(x_t) p(b_t) dx_t db_t \quad (40)$$

where $H_t$ is the contour given by Equation 39.

As before, X is modeled by the set of HMMs $\Lambda_X$. Let the statistical model of B be given by $\Lambda_B$. $\zeta_B$ could be an HMM or a mixture Guassian density. In this study, assume that $\Lambda_B$ is a single Guassian density with a diagonal covariance matrix, i.e., $$p(b_t) = N(b_t, \mu_b, \sigma_b^2) \quad (41)$$

Furthermore, as in Equation 34, consider the specific case of an additive bias, so that the contour $H_t$ is given by $$y_t = x_t + b_t \quad (42)$$

Under these assumptions, the structure of $\Lambda_y$ remains the same as that of $\Lambda_X$. The means and variances of each mixture component in $\Lambda_y$ are derived by adding the mean $\mu_b$ and the variance $\sigma_b^2$ to the means and variances of the corresponding mixture components in $\Lambda_X$, i.e., $$\mu_y = \mu_x + \mu_b \quad (42)$$

$$\sigma_y^2 = \sigma_x^2 + \sigma_b^2 \quad (44)$$

Equations 43 and 44 define the model transformation $G_\eta(.)$ of Equation 3, with the parameters $\eta$ being given by $\mu_b$ and $\sigma_b^2$. If $\Lambda_B$ is more complex such as an HMM or a mixture Guassian density, then the structure of $\Lambda_y$ will be different from that of $\Lambda_X$ in that the number of states and mixture components will be different.

One may now write the parameter estimation problem of Equation 13 as $$\eta' = (\mu'_b \times \sigma_b^{2'}) = \underset{\mu_b, \sigma_b^2}{\text{argmax}} \sum_S \sum_C p(Y, S, C|\eta, \Lambda_X) \quad (45)$$

$$= \underset{\mu_b, \sigma_b^2}{\text{argmax}} \sum_S \sum_C \prod_{t=1}^{T} a_{s_{t-1}, s_t} \omega_{s_t, c_t} N(y_t; \mu_{s_t, c_t} + \mu_b, \sigma_{s_t, c_t}^2 + \sigma_b^2).$$

Again, the EM algorithm can be used to iteratively estimate $\mu_b$ and $\sigma_b^2$. It is easy to show that the auxiliary function corresponding to Equation 21 can be written as $$Q(\eta'|\eta) = -\sum_{t=1}^{T} \sum_{n=1}^{N} \sum_{m=1}^{M} \gamma(n,m) \sum_{i=1}^{D} \left[ \frac{1}{2} \log(\sigma_{n,m,i}^2 + \sigma_{b_i}^{2'}) + \frac{(y_{t,i} - \mu'_{b_i} - \mu_{n,m,i})^2}{2(\sigma_{n,m,i}^2 + \sigma_{b_i}^{2'})} \right]. \quad (46)$$

Maximizing this function with respect to $\eta' = (\mu_b', \sigma_b^{2'})$ does not result in a closed form expression for $\sigma_{b_i}^{2'}$ though a similar expression as in Equation 38 can be found for $\mu_{b_i}'$ so that $$\mu'_{b_i} = \frac{\sum_{t=1}^{T} \sum_{n=1}^{N} \sum_{m=1}^{M} \gamma(n,m)(y_{t,i} - \mu_{n,m,i})/(\sigma_{n,m,i}^2 + \sigma_{b_i}^{2'})}{\sum_{t=1}^{T} \sum_{n=1}^{N} \sum_{m=1}^{M} \gamma(n,m)/(\sigma_{n,m,i}^2 + \sigma_{b_i}^{2'})}. \quad (47)$$

One approach to the problem of estimating $\sigma_{b_i}^2$ is to assume that the variances $\sigma_b^2$ are signal state dependent and are related to the signal variances by $$\sigma_{b,n,m,i}^2 = \alpha_i \sigma_{n,m,i}^2 \quad (48)$$

where $\alpha_i$ is a scaling factor for the ith component of the variance. Substituting Equation 48 in Equation 46 and maximizing with respect to $\alpha_i$, one obtains $$1 + \alpha_i = \frac{1}{T} \sum_{t=1}^{T} \sum_{n=1}^{N} \sum_{m=1}^{M} \gamma(n,m) \frac{(y_{t,i} - \mu_{n,m,i} - \mu'_{b_i})^2}{\sigma_{n,m,i}^2}. \quad (49)$$

Although a physical significance such as the one in Equation 42 cannot be easily attached to the assumption of Equation 48, it allows for a closed-form estimate of the parameters $\mu_b$ and $\sigma_b^2$ as shown in Equations 47 and 49. $\alpha_i > -1$ allows for both a variance expansion ($\alpha > 0$) and a variance contraction ($\alpha < 0$).

An alternate approach consistent with Equation 42 is to write the likelihood $p(Y|\eta,\Lambda_X)$ as $$p(Y|\eta,\Lambda_X) = \sum_S \sum_C \int \int_H p(X,B,S,C|\eta,\Lambda_X) dXdB. \qquad (50)$$

where $\int\int_H$ is the T-fold integral given by $$\int\int_H dXdB = \Pi_{t=1}^T \int\int_H dx_t db_t \qquad (51)$$

Correspondingly, one can define a new auxiliary function as $$Q(\eta'|\eta) = \sum_S \sum_C \int \int_H p(X,B,S,C|\eta,\Lambda_X) \log p(X,B,S,C|\eta',\Lambda_X) dXdB. \qquad (52)$$

This approach has been taken to derive general expressions for the estimates of the parameters of an original speech model given noisy observations, where both the speech and distortion were modeled by a mixture Guassian distribution. The problem addressed in this section is a reverse one of finding the parameters of the distortion model given the distorted speech. The speech model $\Lambda_X$ is an HMM and the additive distortion may be modeled as a single Guassian density as in Equation 41. Under these conditions, one can use the derivations to get the reestimation formulas $$\mu'_{b_i} = \frac{\sum_{t=1}^T \sum_{n=1}^N \sum_{m=1}^M \gamma_t(n,m) E(b_{t,i}|y_{t,i}, s_t=n, c_t=m,\eta,\Lambda_X)}{\sum_{t=1}^T \sum_{n=1}^N \sum_{m=1}^M \gamma_t(n,m)} \qquad (53)$$

$$\sigma^2_{b_i} = \frac{\sum_{t=1}^T \sum_{n=1}^N \sum_{m=1}^M \gamma_t(n,m) E(b^2_{t,i}|y_{t,i}, s_t=n, c_t=m,\eta,\Lambda_X)}{\sum_{t=1}^T \sum_{n=1}^N \sum_{m=1}^M \gamma_t(n,m)} - \mu^2_{b_i}. \qquad (54)$$

As before, $\gamma_t(n,m) = p(Y, s_t=n, c_t=m|\eta,\Lambda_X)$ is the joint likelihood of Y and the mth mixture component of the nth state in the transformed model $\Lambda_y = G_\eta(\Lambda_X)$ producing the observation $y_t$. The conditional expectations in Equation 53 and Equation 54 can be evaluated as $$E(b_{t,i}|y_{t,i}, s_t=n, c_t=m,\eta,\Lambda_X) = \mu_{b_i} + \frac{\sigma^2_{b_i}}{\sigma^2_{n,m,i} + \sigma^2_{b_i}} (y_{t,i} - \mu_{n,m,i} - \mu_{b_i}), \qquad (55)$$

$$E(b^2_{t,i}|y_{t,i}, s_t=n, c_t=m,\eta,\Lambda_X) = \frac{\sigma^2_{b_i} \sigma^2_{n,m,i}}{\sigma^2_{b_i} + \sigma^2_{n,m,i}} + \qquad (56)$$

$$\{E(b_{t,i}|y_{t,i}, s_t=n, c_t=m,\eta,\Lambda_X)\}^2.$$

Examining Equation 55, some observations as to the convergence of the EM algorithm may be made. If $\sigma_b^2$ is small, then the convergence is slow. This was found to be the case in our experiments as the variance in the mismatch due to the different transducers and transmission channels was small. In the limiting case of a deterministic bias ($\sigma_b^2=0$), the estimate does not change at all. This may be remedied by using Equation 47 to estimate $\mu_b$ and Equation 54 to estimate $\sigma_b^2$.

A method for estimating the bias parameters in the feature space and in the model space under the additive model of Equation 34 has been shown. However the additive bias model was only applied to the cepstral features. In our experiments in addition to the cepstral features, delta and delta-delta cepstral features and delta and delta-delta log energy features were used. In the stochastic matching algorithm, the delta and delta-delta log energy features are not transformed. However, the effect of the mismatch on the delta cepstrum and the delta-delta cepstrum is taken into account. For the feature space bias model, the delta and delta-delta cepstral features are assumed unaffected by the mismatch, i.e., the delta and delta-delta bias vectors are zero. This is a meaningful assumption if we assume that the bias in the cepstrum is fixed for the entire utterance. Similarly, for the model space, we assume that the delta and delta-delta mean vectors are zero. However, this is not the case for the delta and delta-delta variances. These variance vectors may be estimated as follows. The delta cepstrum is computed according to $$\Delta C_{l,m} = \sum_{k=-K}^{K} G k C_{l-k,m}, \qquad (57)$$

where $\Delta C_{l,m}$ and $C_{l,m}$ are the mth delta cepstral and the mth cepstral coefficients, respectively, for the lth time frame. G is a gain term fixed at 0.375, and K=2. The delta-delta cepstrum is computed according to $$\Delta^2 C_{l,m} = \sum_{n=-N}^{N} G n \Delta C_{l-n,m}, \qquad (58)$$

where $\Delta^2 C_{l,m}$ is the mth delta-delta cepstral coefficient for the lth time frame. Choose G=0.375 and N=1. Assuming that the cepstral coefficients for different frames are independent, one may write the variance of the delta cepstrum in terms of the variance of the cepstrum as follows:

$$\sigma_{\Delta C_{l,m}}^2 = \sum_{k=-K}^{K} G^2 k^2 \sigma^2_{C_{l-k,m}} \qquad (59)$$

where $\sigma_{\Delta C_{l,m}}^2$ and $\sigma_{C_{l,m}}^2$ are the variances of the mth component of delta cepstrum and cepstrum of the lth time frames. Similarly one may derive the variances of the delta-delta cepstrum as $$\sigma_{\Delta^2 C_{l,m}}^2 = \sum_{n=-N}^{N} \sum_{k=-K}^{K} G^4 n^2 k^2 \sigma^2_{C_{l-k-n,m}} \qquad (60)$$

Estimating the variances of the delta and delta-delta, bias terms is of interest. Since it is assumed that the bias is i.i.d. Guassian, with a variance of $\sigma_b^2$, one may estimate the variance of the ith component of the delta bias using Equations 59 as $$\sigma_{\Delta b_i}^2 = \sum_{k=-k}^{K} G^2 k^2 \sigma^2_{b_i}. \qquad (61)$$

Similarly, one may estimate the variance of the ith component of the delta-delta bias as $$\sigma_{\Delta^2 b_i}^2 = \sum_{n=-N}^{N} \sum_{k=-K}^{K} G^4 n^2 k^2 \sigma^2_{b_i}. \qquad (62)$$

One may observe that the statistical model used for the distortion was a simple Guassian density. The same stochastic matching algorithms discussed above can also be applied to more general model transformation cases.

What we claim is:

1. A method of identifying a signal as similar to a particular stored representation in a set of stored representations of signals, the method comprising:

(a) comparing the signal to the set of stored representations to generate a first set of similarity values;

(b) computing a function of the signal;

(c) determining a transformation based upon the signal, at least a portion of the function, and at least one stored representation associated with at least one similarity value in the first set of similarity values;

(d) transforming the signal with the transformation to generate a transformed signal;

(e) comparing the transformed signal to the set of stored representations to generate a second set of similarity values; and (f) based upon the second set of similarity values, identifying the signal as similar to the particular stored representation.

2. The method of claim 1 wherein each stored representation in the set of stored representations has a corresponding operation, the method further comprising performing an operation associated with the particular stored representation.

3. The method of claim 1 wherein the signal comprises a speech signal.

4. The method of claim 1 further comprising:

(a) determining a new transformation based upon the signal, at least a portion of the function, and the particular stored representation;

(b) transforming the signal with the new transformation to generate a new transformed signal;

(c) comparing the new transformed signal to the set of stored representations to generate a new set of similarity values;

(d) repeating steps (a) through (c) until at least one value in the new set of similarity values is less than a threshold; and (e) identifying the signal as similar to a new particular stored representation associated with the at least one value in the new set of similarity values.

5. The method of claim 1 wherein the signal comprises a frequency domain signal.

6. The method of claim 1 wherein the set of stored representations comprises a set of hidden Markov models and the first set of similarity values and the second set of similarity values are likelihood values.

7. The method of claim 1 wherein the set of stored representations comprises a set of neural networks and the first set of similarity values and the second set of similarity values are neural network output values.

8. The method of claim 1 wherein the set of stored representations comprises a set of vector quantized representations first set of similarity values and the second set of similarity values are distortion values.

9. A method of identifying a signal as similar to a particular stored representation in a set of stored representations of signals, the method comprising:

(a) comparing the signal to the set of stored representations to generate a first set of similarity values;

(b) determining a transformation based upon the signal and at least one stored representation associated with at least one similarity value in the first set of similarity values;

(c) transforming the set of stored representations with the transformation to generate a transformed set of representations;

(d) comparing the signal to the transformed set of representations to generate a second set of similarity values; and (e) based upon the second set of similarity values, identifying the signal as similar to the particular stored representation.

10. The method of claim 9 wherein each stored representation in the set of stored representations has a corresponding operation, the method further comprising performing an operation associated with the particular stored representation.

11. The method of claim 9 wherein the signal comprises a speech signal.

12. The method of claim 9 further comprising:

(a) determining a new transformation based upon the signal and the particular stored representation;

(b) transforming the set of stored representations with the new transformation to generate a new set of stored representations;

(c) comparing the new set of stored representations to the signal to generate a new set of similarity values;

(d) repeating steps (a) through (c) until at least one value in the new set of similarity values is less than a threshold; and (e) identifying the signal as similar to a new particular stored representation associated with the at least one value in the new set of similarity values.

13. The method of claim 9 wherein the signal comprises a frequency domain signal.

14. The method of claim 9 wherein the set of stored representations comprises a set of hidden Markov models and the first set of similarity values and the second set of similarity values are likelihood values.

15. The method of claim 9 wherein the set of stored representations comprises a set of neural networks and the first set of similarity values and the second set of similarity values are neural network output values.

16. The method of claim 9 wherein the set of stored representations comprises a set of vector quantized representations first set of similarity values and the second set of similarity values are distortion values.

17. A method of identifying a signal as similar to a particular stored representation in a set of stored representations of signals, the method comprising:

(a) comparing the signal to the set of stored representations;

(b) iteratively transforming the signal and the set of stored representations based on said comparison such that each iteration brings a representation of the signal closer to at least one stored representation in a current set of representations; and (c) identifying the signal as similar to the at least one stored representation based upon said transformations.

18. The method of claim 17 wherein each stored representation in the set of stored representations has a corresponding operation, the method further comprising performing an operation associated with the particular stored representation.

19. The method of claim 17 wherein the signal comprises a speech signal.

20. The method of claim 17 wherein step (a) is performed until a similarity value associated with the at least one stored representation is less than a threshold.

21. The method of claim 17 wherein the signal comprises a frequency domain signal.

22. The method of claim 17 wherein the set of stored representations comprises a set of hidden Markov models and the first set of similarity values and the second set of similarity values are likelihood values.

23. The method of claim 17 wherein the set of stored representations comprises a set of neural networks and the first set of similarity values and the second set of similarity values are neural network output values.

24. The method of claim 17 wherein the set of stored representations comprises a set of vector quantized representations first set of similarity values and the second set of similarity values are distortion values.

* * * * *